Feb. 28, 1961    S. HILLMAN    2,972,759
AUTOMATIC NUT TAPPING MACHINE HAVING TOOLS AND WORK HOLDERS
MOVABLE IN A CIRCULAR PATH WITH IMPROVED NUT
FEEDING AND PICK OFF MEANS
Filed Dec. 26, 1957    3 Sheets-Sheet 1
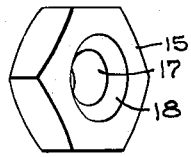
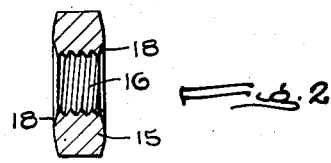
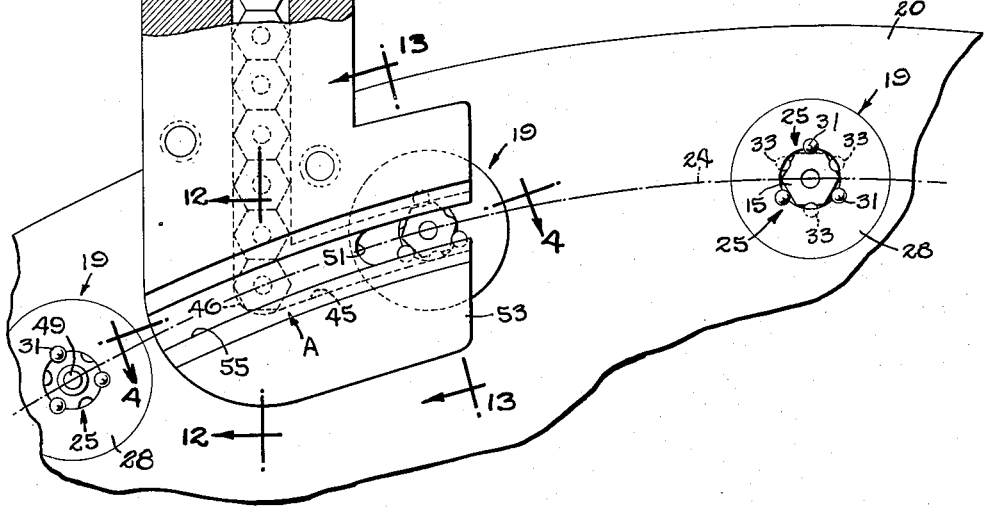
INVENTOR
Swan Hillman
by Carlson, Pitzner, Hubbard & Wolfe
ATTORNEY

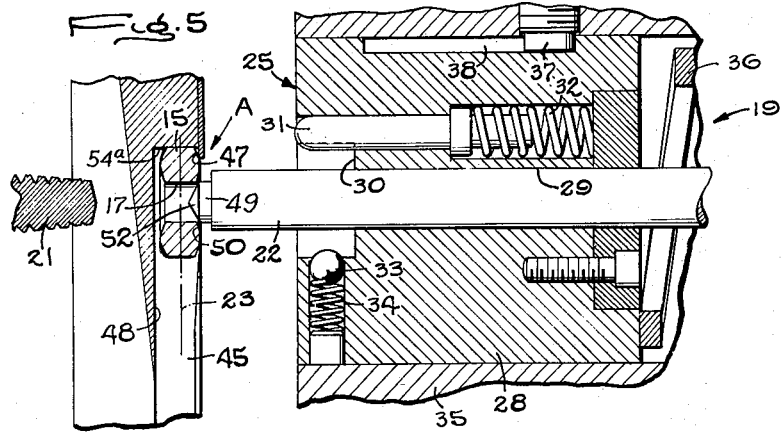
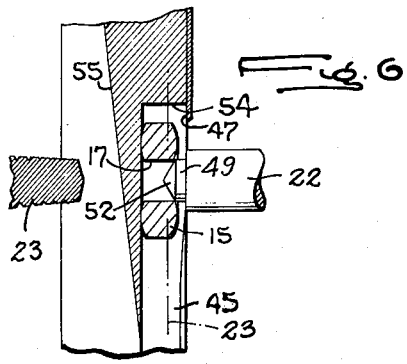
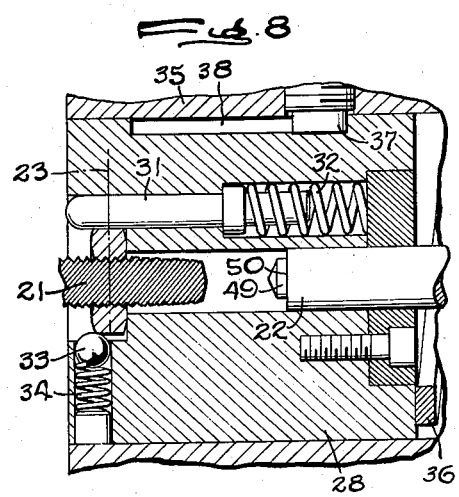
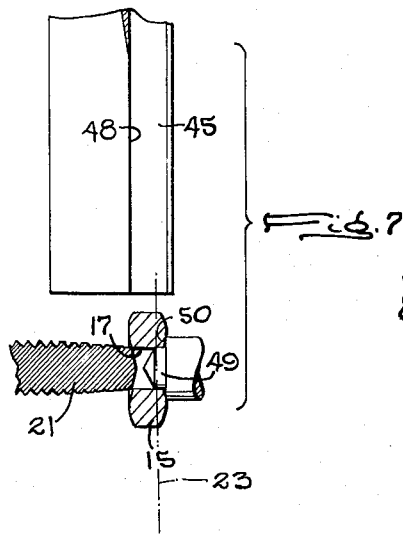
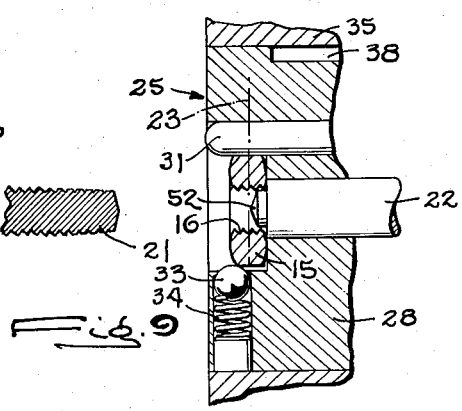

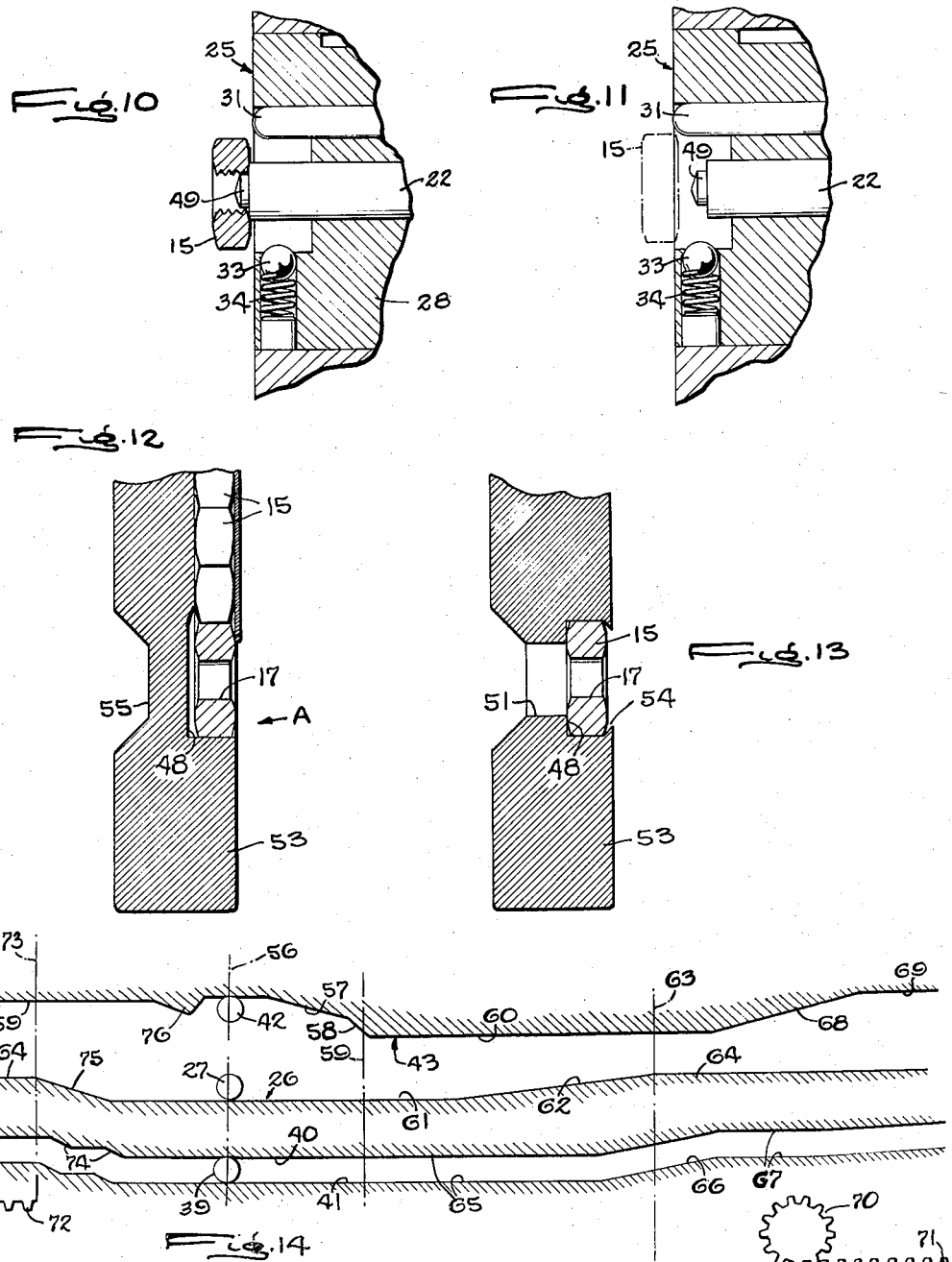

United States Patent Office 2,972,759
Patented Feb. 28, 1961

2,972,759

AUTOMATIC NUT TAPPING MACHINE HAVING TOOLS AND WORK HOLDERS MOVABLE IN A CIRCULAR PATH WITH IMPROVED NUT FEEDING AND PICK OFF MEANS

Swan Hillman, % Rockford Screw Products Co., 2501 9th St., Rockford, Ill.

Filed Dec. 26, 1957, Ser. No. 705,333

1 Claim. (Cl. 10—139)

This invention relates to a nut tapping machine of the type shown in my Patent No. 2,802,224 in which the lowermost nut blank in a feed chute is picked up by the timed projection of a tap and a coacting pick-off element moving continuously in a cylindrical path including the axis of the terminal blank. After the terminal blank has been picked off, centered relative to the tap, and carried circumferentially out of the chute, the tap and the blank are rotated and shifted axially relative to each other to thread the hole in the blank while the blank is traveling around the path.

In the patented tapping machine, the ends of the tap and the pick-off element enter opposite ends of the hole in the blank substantially simultaneously and coact with each other to transfer the blank out of the chute and center it with respect to the tap before the tap starts the cutting action. I have discovered that transfer and centering of blanks in this manner are detrimental to the taps and result in breakage of the cutting edges and excessive wear which reduce their service life to a marked degree.

The primary object of the present invention is to overcome the above mentioned difficulty by picking up the terminal nut blank, initiating its later transfer out of the chute, and fully centering the blank relative to the tap before it is effectually engaged by the tap.

A more detailed object is to effect the pick-off and centering of the terminal blank by a tool projected into one end of the hole in the blank and coacting with a backing in the outlet passage of the chute to center the pick-off blank.

The invention also resides in the novel manner of correlating the advance of the pick-off and centering tool and the tap with the outlet guideway from the chute so as to retain positive control of the terminal blank during its pick-off and centering and until its engagement by the tap.

Other objects and advantages of the invention will become apparent from the following detailed description taken in connection with the accompanying drawings, in which Figure 1 is a perspective view of a nut blank of the type adapted to be tapped in the improved machine embodying the novel features of the present invention.

Fig. 2 is a cross-sectional view of the finished nut.

Fig. 3 is a fragmentary elevational view taken along the diametrical plane of the improved machine.

Fig. 4 is a fragmentary sectional view taken along the line 4—4 of Fig. 3.

Figs. 5 through 11 are fragmentary views similar to Fig. 4 showing the tools in different positions during successive operations of a nut blank.

Figs. 12 and 13 are fragmentary sectional views taken along the lines 12—12 and 13—13 respectively in Fig. 3 and showing a nut blank in different positions along the exit guideway of the feed chute.

Fig. 14 is a combined development view and time chart showing the portions of the actuating cams which operate during transfer of the terminal blank out of the feed chute.

The invention is shown in the drawings for purposes of illustration embodied in a machine for automatically picking up individual nut blanks 15 (Figs. 1 and 2) and tapping the same to form a screw thread 16 around a center hole 17 therein. In this instance, each blank is of hexagonal peripheral contour with frustoconical recesses 18 tapering inwardly from flat end faces and centered with respect to the axis of the center hole.

The improved tapping machine is of the type disclosed in my Patent No. 2,802,224 and comprises a plurality of combined pick-off and tapping units 19 angularly spaced around a drum-like rotary carrier 20 (Fig. 3). In the present instance, there are twenty-four units and each comprises a tap 21 and a gripping or pick-off element in the form of an elongated pin 22 mounted on the carrier on opposite sides of a medial plane 23 and having a common axis parallel to the carrier axis and normal to the plane. Generally, the improved machine operates in a manner similar to the patented machine with each tapping unit moving bodily in a cylindrical path 24 and actuated successively during rotation of the carrier to pick up a nut blank in a loading position A (Figs. 3, 4 and 5) in the medial plane 23, center the blank on the tap axis, seat the centered blank in a chuck 25 (Fig. 5), tap the center hole 17 (Fig. 8), and screw the blank off from the tap (Fig. 9).

The construction of the carrier 20, its mounting, and the manner of supporting the tap 21 on the carrier for rotary and axial sliding movements are the same as in the patented machine and therefore are not shown or described in detail here. Also, the mechanism for shifting the tap axially includes a similar stationarily mounted annular cam 26 (shown in development in Fig. 14) and a follower 27 spring urged against an axially facing surface on the cam, the tap shifting toward and away from the medial plane as the follower engages rises and falls on the cam surface.

As in the patented machine, the chuck 25 is concentric with the pick-up pin 22 and comprises a cylindrical body 28 (Fig. 5) having a central bore 29 slidably receiving the pin and a counterbore 30 opening axially toward the medial plane 23 to receive nut blanks 15. Angularly spaced equal distances around the counterbore and slidable axially in the body are three elongated pins or jaws 31 which are urged outwardly toward the medial plane 23. Intervening between the pins and angularly spaced equal distances therefrom are three jaws in the form of balls 33 which are shiftable radially of the body and are urged inwardly by springs 34 to limit positions in which each ball projects partially into the counterbore. When a nut blank alined axially with the chuck is shifted bodily into the counterbore and against the bottom wall thereof, the pins and balls coact to hold the blank against the wall and prevent turning of the blank relative to the chuck.

The mounting of the chuck 25 in the carrier 20 is the same as in the patented machine and includes a sleeve 35 slidable in the carrier along the axis of the tapping unit 19 and slidably receiving the chuck body 28 in its end adjacent the medial plane 23. A spring 36 urges the body 28 toward the plane and relative to the sleeve to a limit position of abutment of a pin 37 on the sleeve with one end of a slot 38 in the body as shown in Figs. 7 and 8. At its other end (not shown), the sleeve rotatably supports a follower roller 39 which is received between two opposed and axially facing cam surfaces 40 and 41 (Fig. 14) extending around the periphery of the carrier and stationarily mounted as in the patented machine to shift the sleeve and thus the chuck toward and away from the medial plane during rotation of the carrier.

The pick-off pin 22 also is mounted in the same manner as in the patented machine for axial shifting relative to the chuck body 28 and the medial plane 23. Such shifting is effected by a follower 42 (Fig. 14) spring urged against another stationarily mounted open face cam 43 and acting through a spring (not shown) to shift the pin toward and away from the medial plane as the follower engages rises and falls in the cam during rotation of the carrier.

The blanks 15 to be tapped are supported in a row in a chute 44 with their flat peripheral edges in abutment (Fig. 3) and gravitate one by one along the chute to the loading position A in which the terminal blank is disposed in the medial plane 23 and abuts a stop surface 45. The latter faces radially and outwardly from the inner side of the cylindrical path 24 defined by the axes of the tapping units 19 and coacts with a curved surface 46 on the chute to engage the periphery of the terminal blank and position the blank with its axis lying on the path. Axially facing and axially spaced guide surfaces 47 and 48 (Figs. 4 and 5) rigid with the chute on opposite sides of the medial plane engage the terminal blank and prevent it from shifting axially out of the loading position. To permit the blank to move out of the chute and along the cylindrical path, the chute opens circumferentially along the stop surface 45 in the direction of turning of the carrier 20.

I have discovered that the objectionable wearing of the taps in service use of my patented machine above referred to is attributable to the use of the tap as one of the elements for picking the terminal blank out of the chute and the consequent engagement of the tap and the blank before the latter becomes centered and held properly in relation to the tap. Based on this discovery, the present invention aims to prolong the service life of the taps substantially by utilizing the pin 22 alone in picking the terminal blank out of the chute and locating the blank rigidly in the plane 23 and centered precisely on the axis of the tap before the latter is advanced to bring its cutting edges into engagement with the metal of the blank. To these ends, axial positioning and centering of the blank is effected as an incident to picking the blank out of the chute in the axial advance of the pin 22 while the tap remains retracted.

Accordingly, only the pick-off pin 22 is advanced axially into engagement with the terminal blank 15 as the tapping unit 19 passes the loading position A at the lower end of the chute 44. The pin is projected into the center hole 17 of the blank and shifts the blank circumferentially out of the chute by contacting the defining wall of the hole. The pick-off pin also centers the blank and, for this purpose, its end portion 49 which enters the center hole is of a diameter only slightly less than the diameter of the hole. During the entry of the end portion of the pin and as the blank advances with it along the cylindrical path 24, the blank is backed by and slides along the guide surface 48 on the opposite side of the medial plane 23 from the pin. Cooperating with this surface to retain control of the blank so that its axis lies along the tap axis as the blank slides along the surface is a shoulder or abutment 50 formed on the pin and facing axially toward the guide surface to engage the adjacent end face of the blank.

The tap 21 remains out of contact with the terminal blank 15 as the latter is transferred out of the chute 44 and shifted into its centered position against the guide or backing surface 48. Then, the tap is advanced axially toward the medial plane 23 and into contact with the blank, control of the blank thus being transferred from the backing surface and the shoulder 50 on the pick-off pin to the tap and the shoulder. Continued engagement of the blank with the backing surface until the tap engages the blank is achieved by correlating the circumferential extent of the surface along the cylindrical path 24 with the axial advance of the tap. Also, the backing surface is slotted along the path as indicated at 51 (Figs. 3, 4 and 13) to provide an opening for passage of the tap axially through and beyond the surface. The slot is wide enough to receive the tap while still leaving edge portions on the surface wide enough to engage the adjacent flat end of the blank on opposite sides of the center hole.

In the present instance, the centering portion 49 of the pick-off pin 22 is of cylindrical contour. To guide the blank onto this cylindrical surface and shift the blank transaxially of the pin in the event that this surface and the center hole 17 are not in precise alinement as the pin advances axially, the pin preferably projects beyond the surface a short distance to provide a tapered guide surface 52 merging with the cylindrical surface. Thus, if the hole in the blank and the cylindrical portion of the pin are offset axially when the pin is projected forwardly into the hole of the terminal blank of the chute, the coned surface 52 acts as a cam to shift the blank edgewise relative to the pin and thus center the blank on the portion 49 for full entry of the latter into the hole in the blank. The shoulder 50 herein is a continuous annulus lying in a plane parallel to the medial plane at the inner end of the cylindrical surface. While the pin may be formed in two parts with the shoulder shiftable axially relative to the cylindrical surface, the two preferably are formed as integral parts of a single piece as shown.

The backing surface 48 lies in a plane paralleling the medial plane and, in this instance, forms one wall of a guideway in a lateral extension 53 (Fig. 3) which projects rigidly along the cylindrical path 24 from the lower end of the chute 44. A bottom wall of the guideway is defined by the radially facing stop surface 45 which is coextensive with the backing surface and curves so as to parallel the cylindrical path. Opposite the backing surface, the extension is slotted as indicated at 54 and the guideway opens axially to receive the pick-off pin 22 (Figs. 4, 6 and 13). This slot extends throughout the length of the guideway, but the other slot 51 for the tap 21 extends along only approximately half of the length at the exit end of the guideway. On the side facing axially toward the tap, a tapering recess 55 is formed in the guideway extension 53 (Figs. 3 and 4) to provide clearance for axial advance of the tap.

Successive advance of the tap 21 and the pick-off pin 22 and the other axial movements of these parts and the chuck 25 are effected by the cams 26, 40, 41 and 43 in cooperation with the followers 27, 39 and 42. In the operation of the improved machine, let it be assumed that the tool carrier 20 is turning clockwise as viewed in Fig. 3 and that one tapping unit 19 is moving upwardly around the cylindrical path 24 and approaching the chute 44 as in the case of the leftmost unit shown in this figure. The followers 27, 39 and 42 of the unit then are engaging dwell surfaces on the cams as indicated along a line 56 in Fig. 14. At this time, the pick-off pin 22, the tap 21, and the chuck 25 all are spaced from the medial plane 23 so as to pass on opposite sides of the lower end of the chute 44.

During continued rotation of the carrier 20 and as the unit 19 is passing the lower end of the chute 44, the follower 42 for the pick-off pin 22 engages a gradual rise 57 on the cam 43 and the pin starts to shift toward the medial plane 23. When the pin is almost in axial alinement with the center hole 17 of the terminal blank 15, the follower contacts a more abrupt rise 58 and is advanced thereby to enter the tip of the tapered surface 52 into the hole in the blank as shown in Fig. 5, movement of the blank away from the side 54a of the chute slot being started as soon as the side of the pin engages the edge of the blank hole 17 as shown in Fig. 5A. Then as the pin continues to advance into the hole, the blank is cammed into centered position relative to the pin thus permitting entry of the reduced cylindrical portion 49 to bring the shoulder 50 with the blank pushed against the backing surface 48 as shown in Fig. 6. Then the follower for the pin rides onto a dwell 60 where it remains until after the blank is seated in the chuck 25. As an incident to projection of the end portions of the pin into the hole, the terminal blank is shifted along the cylindrical path 24 with the pin and is adjusted transversely of the pin and into axial alinement therewith.

The follower 27 for the tap 21 continues to ride a dwell surface 61 as the unit 19 passes the lower end of the chute 44 and until the terminal blank 15 has traveled through approximately half the length of the guideway in the extension 53. Then, while the blank is held against and sliding along the backing surface 48, the follower engages a rise 62 to shift the tap axially through the slot 51 in the guideway and into contact with the blank. When this contact takes place as shown in Fig. 4, the blank is centered on the tap axis by the cylindrical portion 48 of the pick-off pin 22 and is backed by the shoulder 50 so that it remains normal to the tap axis. It is in this position with respect to the tap that the blank is clamped between the tap and the shoulder and moves beyond the exit end of the guideway, a line 63 in Fig. 14 indicating the position of the tap and pin followers 27 and 42 as the blank leaves the guideway.

As the unit 19 moves beyond the exit end of the guideway in the extension 53, the tap follower 27 rides onto a dwell surface 64 where it remains until the tapping operation is completed and the unit again approaches the chute. The chuck follower 39 which engaged dwell surfaces 65 during pick-up and centering of the terminal blank 15 and axial advance of the tap contacts a rise 66 on the cam 41 and begins to advance axially toward the tap just before the blank leaves the guideway. This advance continues until the blank is seated within the pins 31 and balls 33 of the chuck and against the bottom of the counterbore 30 in the chuck body 28. Then the chuck follower 39 engages dwell surfaces 67 and the follower for the pick-off pin 22 rides down a fall 68 and onto a dwell 69 for retraction of the pin throughout the tapping operation.

After the blank 15 is seated in the chuck 25 and the pick-off pin 22 is retracted, the chuck is shifted axially in opposite directions and the tap 21 is rotated in opposite directions in timed relation to the axial shifting of the chuck to effect the tapping operation in the same manner as in the patented machine and by the same mechanism. The latter includes a gear 70 rotatable with the tap and arcuate rack bars 71 and 72 angularly spaced along the path of the units and located respectively on the inner and outer sides of the path. When the tapping operation is completed as indicated along a line 73 in Fig. 14, the chuck follower 39 engages successive rises 74 on the cam 40 to shift the chuck axially away from the tap and to its starting position indicated by the line 56 and shown in Fig. 11, the tapped blank remaining in the chuck. Also, the tap follower 27 rides down a fall 75 to its starting dwell surface 61. To eject the tapped blank from the chuck, the follower 42 for the pick-off pin 22 engages a node 76 and the pin thereby is projected beyond the chuck as shown in Fig. 10. The pin then returns to the starting position shown in Fig. 11 so that all of the parts of the unit are ready for another cycle.

It will be apparent that, when the tap 21 initially engages the terminal blank 15, the latter is moving along the cylindrical path 24 at the same speed and is both centered relative to the tap and disposed normal to the tap axis. This relation is made possible by the successive advance of the pick-off pin 22 and the tap and the coaction of the backing surface 48 with the pin. The backing surface thus engages an end face of the blank during entry of the pin and centering of the blank by the pin and extends far enough along the cylindrical path to cooperate with the pin and maintain the blank centered on and normal to the tap axis at the time of initial engagement of the tap with the blank. This same relation of the blank and the tap is maintained by the pin and the tap during transfer of the blank into the chuck 25 and by the chuck during starting of the tapping operation. As a result, the thread 16 cut in the blank is of substantially uniform depth and is concentric with the axis of the blank throughout the length of the hole. Any tendency for the tap to become damaged therefore is small and its life is substantially prolonged.

I claim as my invention:

In a machine for tapping center holes in nut blanks, the combination of, a carrier continuously rotatable about a fixed axis, axially alined pick-off and tapping elements paralleling said axis and mounted on said carrier on opposite sides of a transaxial medial plane disposed between adjacent ends of the elements, said pick-off element having a reduced end portion adapted to fit closely in said blank holes and terminating in a coned end surface coacting with the wall of a hole to center the blank on said reduced end portion, the latter terminating in an axially facing shoulder, means supporting a row of said blanks and advancing the same one by one to a pick-off position in which terminal blank lies in said plane with its axis in the cylindrical path defined by the axis of said elements, a stationary guide paralleling and extending along said path from said pick-off position on the side of said plane opposite said pick-off element and engageable with the blank to form a backing for maintaining the blank substantially in the plane during its movement edgewise out of said position and for a limited movement therebeyond, mechanism supporting said pick-off element on said carrier for axial movement toward said plane, mechanism operable, during turning of said carrier and movement of said elements therewith past said pick-off position and while said tapping element remains retracted away from said plane, to advance said pick-off element axially into the hole of said terminal blank at said position and cause said coned end surface to enter the blank hole and guide the blank onto said reduced end portion as the blank is pushed against and held by said shoulder against said guide while being slid edgewise along the guide and out of said position, and mechanism operable after centering of the picked-off blank on said reduced end and while the blank is held against said guide, to shift said elements relative to each other along their axis to bring the blank into engagement with said tapping element also during turning of said carrier.

References Cited in the file of this patent

UNITED STATES PATENTS

| | | |
|---|---|---|
| 1,592,009 | Simpson | July 13, 1926 |
| 2,037,801 | Larsen | Apr. 21, 1936 |
| 2,802,224 | Hillman | Aug. 13, 1957 |
| 2,802,526 | Hillman | Aug. 13, 1957 |